Jan. 27, 1931.  A. C. LINDGREN  1,790,061
TRACTOR HARROW HITCH
Filed Nov. 7, 1927  2 Sheets-Sheet 1
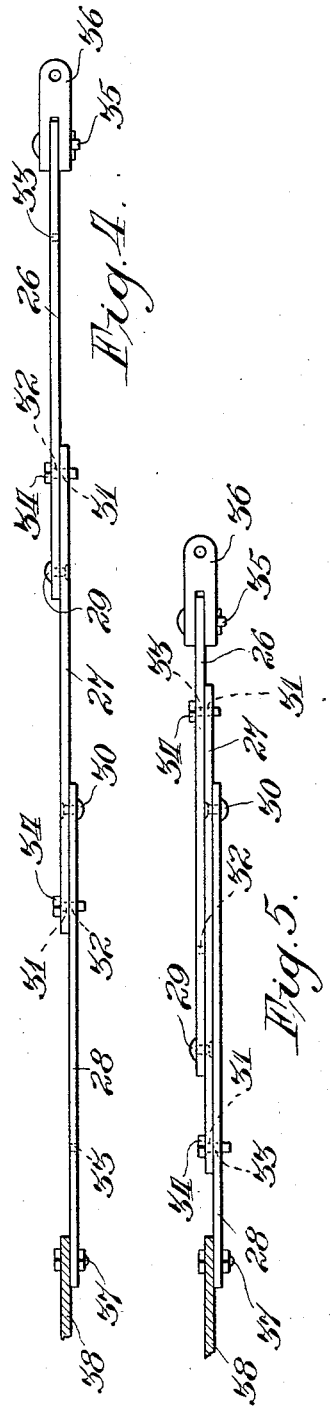
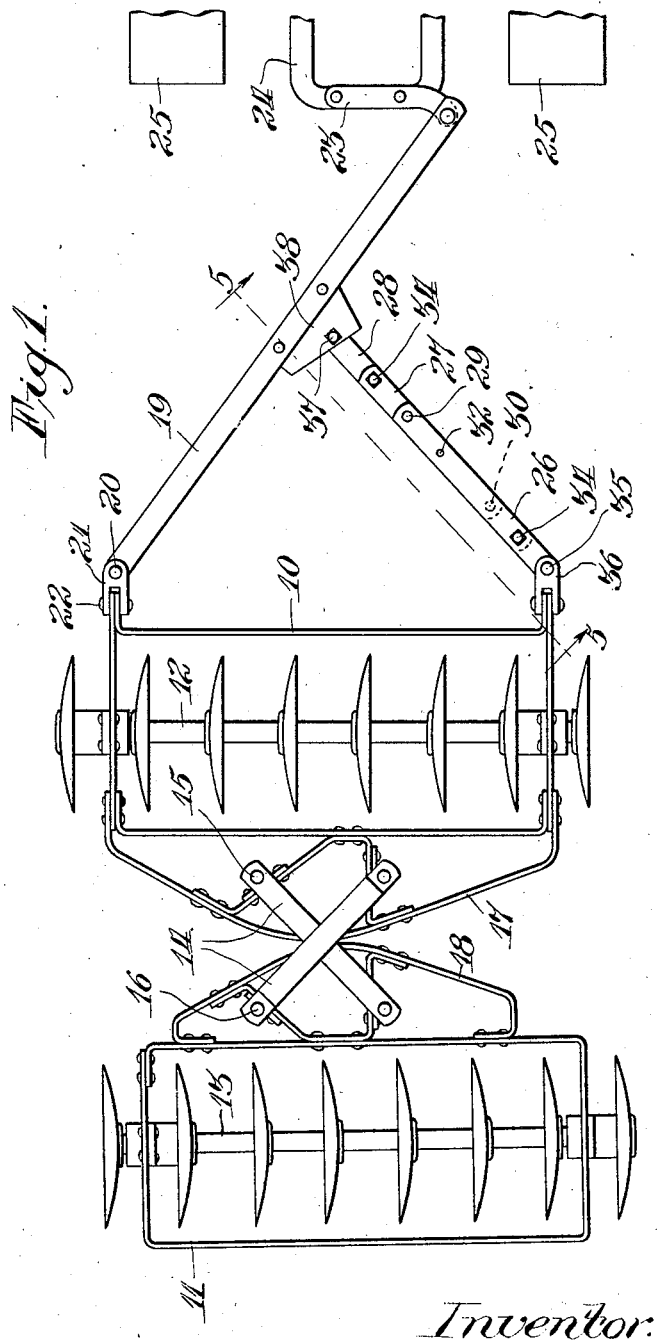
Inventor:
Alexus C. Lindgren,
By H.P. Doolittle
Atty.

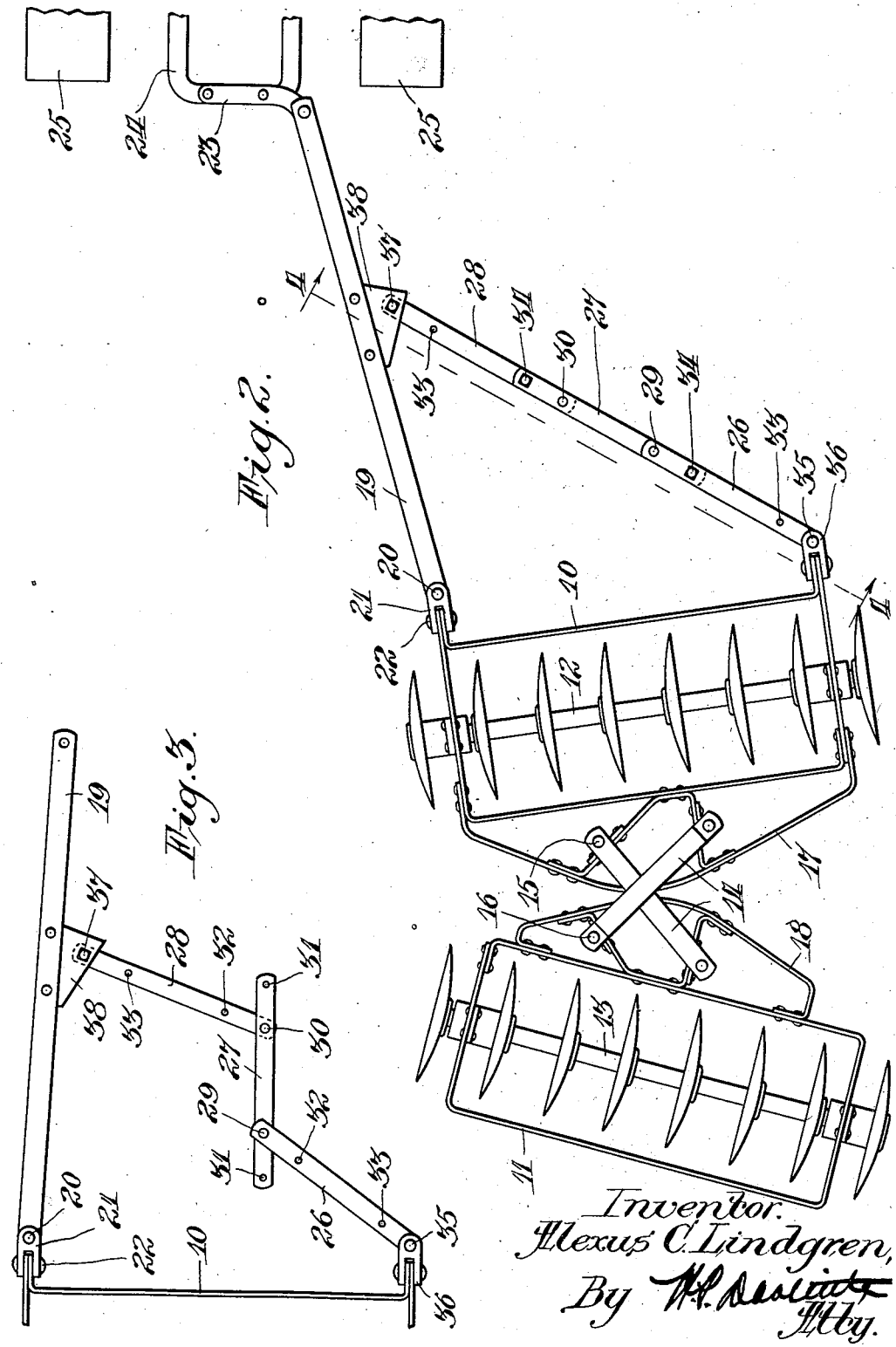

Patented Jan. 27, 1931

1,790,061

UNITED STATES PATENT OFFICE

ALEXUS C. LINDGREN, OF CHICAGO, ILLINOIS, ASSIGNOR TO INTERNATIONAL HARVESTER COMPANY, A CORPORATION OF NEW JERSEY

TRACTOR HARROW HITCH

Application filed November 7, 1927. Serial No. 231,405.

This invention relates to implement hitches and in particular to a laterally shiftable hitch for tractor-drawn implements.

The object of the invention is to provide a simple form of laterally adjustable draft connection between an implement, such as a disk harrow, and a tractor that will permit the implement to be drawn either directly behind the tractor or in lateral offset relation thereto; which will effectively retain the implement in either of said positions, and which will be capable of ready change from central to offset draft positions through novel and simple mechanism for altering the length of one of the members of the draft connection.

Other objects and advantages will become apparent from the following description of one specific construction embodying the invention, the scope of which is defined in the following claims.

Referring to the drawings,—

Figure 1 is a plan view showing the draft connection of this invention applied to a tractor disk harrow;

Figure 2 is a similar plan view showing the draft connection in a different position of adjustment;

Figure 3 is a plan view showing the draft connection with one of its members in a position assumed by its parts during the process of adjustment;

Figure 4 is a detail view of a part of the draft connection on an enlarged scale and viewed on the line 4—4 of Figure 2; and Figure 5 is a similar view on the line 5—5 of Figure 1 of the draft member shown in Figure 4, with its parts adjusted to a different position.

For purposes of illustration, the invention has been shown as applied to a tractor disk harrow of the two-gang type for which the draft connection to be described is particularly well adapted. The harrow comprises front and rear oblong rectangular frames 10 and 11 in which are mounted disk gangs 12 and 13. The frames are connected by a pivotal or rocking connection comprising freely movable cross members 14, respectively pivoted at 15 and 16 to oppositely projecting auxiliary frames 17, 18 fixed on the adjacent sides of the respective implement frames. Suitable means is provided for effecting angular adjustment of the two frames, but, as neither said means nor the tractor harrow structure above described forms the subject-matter of the present invention, no further description is necessary as these form the subject-matter of assignee's co-pending application by W. C. Dwyer, Serial No. 231,433, filed November 7, 1927.

The draft connection embodying the present invention comprises a main draft member 19 which is pivoted on a vertical axis at 20 to one end of the front transverse bar of the implement frame 10. This connection is preferably made through a clevis 21 pivoted to the frame on a horizontal axis at 22. At its forward end the draft member 19 carries hitching means, such as a bar 23, which is adapted for connection to the draw-bar 24 of a tractor, the wheels of which are seen in fragment at 25. The draft connection also comprises a second draft member made up of a plurality of (in this instance 3) elongated flat bars 26, 27 and 28. As best seen in Figure 4, these bars are disposed with their adjacent ends in superposed overlapped relation and with the central bar permanently pivotally connected, as at 29 and 30, to the ends of the other two bars. These points of pivotal connection on the central bar 27 are spaced inwardly from the ends of that bar, and the points of connection with the other two bars are at the ends thereof. This structure permits the central bar to be reversed on its pivots 29 and 30 so as to cause the three bars to assume the positions shown in Figure 5, and, in order to permit the bars to be locked in either of the two positions shown, the ends of bar 27 are provided with pin or lock bolt receiving openings at 31, and corresponding openings 32 and 33 so spaced from the ends of bars 26 and 28 as to register with the openings 31, are formed in said members. It follows, therefore, that the articulated draft member made up of the sections 26, 27 and 28, can be adjusted by folding and unfolding the bar sections as above described so that its length can be altered to thereby vary the angle between it and the main draft member 19. When the articulated sections are brought into either of their adjusted positions, they may be locked in rectilinear relation as by means of lock bolts 34 placed in the registered openings 31 and 32 or 31 and 33, according to whether the bars are folded or unfolded. The articulated draft member just described has one end pivotally connected on a vertical axis to the implement frame at 35 through a clevis 36 similar to the clevis 21, and its other or forward end is pivotally connected at 37 to the main draft member 19 through a pivot plate 38 secured to the member 19 intermediate its ends.

The construction above described provides a draft connection made up of two converging draft members, one of which is composed of articulated sections so constructed as to be readily contractable and expansible without disconnection of parts or change in the construction other than the removal of lock bolts 34 and their reinsertion in the lock openings when the sections are in adjusted position. As seen in Figure 3, removal of the lock bolts permits the sections of the draft member to swing on each other in the manner illustrated, and the main draft member 19 is, therefore, swung on its pivot 20 to bring the hitching point either towards or away from the opposite end of the implement frame. When the articulated draft member is extended the proportion of the parts is such that the hitching point will be offset slightly to one side of the implement frame and the implement will, therefore, be trailed at one side of the path of the tractor. On the other hand, when the articulated member is contracted, as in Figure 1, the hitch point is brought inwardly and the implement will trail directly in the tractor's path. It will be obvious that both folding and unfolding of the articulated member may be effected by forward or backward movement of the tractor after the lock bolts are removed and dead center relation of the linked sections is broken, as in Figure 3.

It will be obvious to those skilled in the art that the above disclosure exemplies a simple and novel form of draft connection particularly adaptable to orchard disk tractor harrows, and that the draft connection specifically described is capable of certain modifications within the scope of the following claims without departure from the spirit of the invention.

What is claimed as new is:

1. The combination with an implement frame, of draft connections comprising a pair of draft members pivoted to the frame on vertical axes at laterally spaced points and pivotally connected together forwardly of said frame connections, a draft connection on the forward ends of said members, and means for adjusting the position of the draft connection laterally with respect to the frame by changing the angular relation of said members comprising a plurality of permanently articulated overlapped links forming one of said members, and means for locking said links in either extended or contracted adjustment.

2. A hitch comprising angularly related draft members connected together at one point, one of said members comprising a plurality of overlapped permanently pivotally connected sections swingable over each other into different positions in which the sections are in rectilinear relation and in each of which positions different lengths of the respective sections are in overlapped relation.

3. A hitch comprising angularly related members pivoted together at one point, one of said members comprising permanently articulated sections including three elongated flat bars disposed with ends in superposed overlapped relation and with the central bar reversibly pivotally joined at points spaced inwardly from its ends to the ends of the other two bars, the central bar and connected bars being each provided with lock bolt receiving openings which register in the respective reversed positions of the central bar.

In testimony whereof I affix my signature.

ALEXUS C. LINDGREN.